(12) United States Patent
Zhang et al.

(10) Patent No.: US 10,146,990 B2
(45) Date of Patent: Dec. 4, 2018

(54) METHOD AND DEVICE FOR FINGERPRINT UNLOCKING AND USER TERMINAL

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

(21) Appl. No.: 15/842,936

(22) Filed: Dec. 15, 2017

(65) Prior Publication Data
US 2018/0107862 A1   Apr. 19, 2018

Related U.S. Application Data

(63) Continuation of application No. 15/605,173, filed on May 25, 2017.

(30) Foreign Application Priority Data

May 27, 2016   (CN) .......................... 2016 1 0368932

(51) Int. Cl.
*G06K 9/00* (2006.01)
*G06F 21/32* (2013.01)

(52) U.S. Cl.
CPC ......... *G06K 9/00087* (2013.01); *G06F 21/32* (2013.01); *G06K 9/00026* (2013.01); *G06K 9/00067* (2013.01)

(58) Field of Classification Search
CPC ..................... G06K 9/00087; G06K 9/00067
See application file for complete search history.

(56) References Cited

U.S. PATENT DOCUMENTS 9,710,691 B1 *   7/2017   Hatcher ............. G06K 9/00033
2004/0151352 A1 *  8/2004   Nakajima .......... G06K 9/00087
                                                        382/124

(Continued)

FOREIGN PATENT DOCUMENTS

CN      103198289 A     7/2013
CN      204480255 U     7/2015

(Continued)

OTHER PUBLICATIONS

Tsai-Yang Jea, Venu Govindaraju; "Aminutia-based partial fingerprint recognition system"; Elsevier, 2005.*

(Continued)

*Primary Examiner* — Shaghayegh Azima
(74) *Attorney, Agent, or Firm* — Young Basile Hanlon & MacFarlane, P.C.

(57) ABSTRACT

A method and a user terminal are provided for fingerprint unlocking. The method includes: receiving a partial fingerprint image during a process of pressing a fingerprint recognition sensor of a user terminal where the partial fingerprint image corresponds to part of fingerprints of a finger, matching the partial fingerprint image during the process of receiving the partial fingerprint image, and unlocking a user terminal when the partial fingerprint image is matched. The receiving includes: receiving N fingerprint region images by scanning from N directions, N being an integer larger than 1; calculating the clarity of each of the N fingerprint region images; and selecting one of the N fingerprint region images as the partial fingerprint image, the clarity of the one of the N fingerprint region images being larger than a first preset threshold.

2 Claims, 5 Drawing Sheets

(56) References Cited

U.S. PATENT DOCUMENTS

| | | | | |
|---|---|---|---|---|
| 2004/0218790 | A1* | 11/2004 | Ping Lo | G06K 9/00067 382/124 |
| 2004/0228508 | A1* | 11/2004 | Shigeta | G06K 9/00026 382/124 |
| 2005/0238212 | A1* | 10/2005 | Du | G06K 9/00026 382/124 |
| 2007/0047785 | A1* | 3/2007 | Jang | G06K 9/0008 382/125 |
| 2008/0226132 | A1* | 9/2008 | Gardner | G06K 9/00026 382/107 |
| 2013/0279770 | A1* | 10/2013 | Abe | G06K 9/00087 382/124 |
| 2014/0002238 | A1* | 1/2014 | Taveau | G07C 9/00087 340/5.53 |
| 2014/0359757 | A1* | 12/2014 | Sezan | G06F 21/32 726/19 |
| 2015/0154437 | A1* | 6/2015 | Aoki | G06K 9/0008 382/124 |
| 2015/0169934 | A1* | 6/2015 | Tsai | G06K 9/00033 382/115 |
| 2016/0350580 | A1* | 12/2016 | Pyun | G06K 9/00073 |
| 2017/0337410 | A1* | 11/2017 | Wang | G06K 9/00892 |
| 2017/0344802 | A1* | 11/2017 | Zhang | G06F 21/32 |
| 2018/0068155 | A1* | 3/2018 | Call | A61B 8/06 |

FOREIGN PATENT DOCUMENTS

| | | |
|---|---|---|
| CN | 105117630 A | 12/2015 |
| CN | 105205367 A | 12/2015 |
| CN | 105303090 A | 2/2016 |
| CN | 105335707 A | 2/2016 |
| CN | 105353965 A | 2/2016 |
| WO | 2016072921 A1 | 5/2016 |

OTHER PUBLICATIONS

Yang S et al., Efficient and Secure Fingerprint Verification for Embedded Devices[J], "Eurasip Journal on Advances in Signal Processing", Jan. 1, 2006, 2006(1):1-11, US.

Partial supplementary European search report issued in corresponding European application No. 17169797.2 dated Oct. 9, 2017.

Jea et al., "A minutia-based partial fingerprint recognition system", Pattern Recognition, Elsevier, GB, vol. 38, No. 10, Oct. 1, 2005 (13 pp).

International Search Report issued in corresponding International Application No. PCT/CN2017/083580 dated Aug. 15, 2017 (12 pp).

Extended European Search Report issued in corresponding European Application No. 17169797.2 dated Jan. 29, 2018 (15 pp).

* cited by examiner

METHOD AND DEVICE FOR FINGERPRINT UNLOCKING AND USER TERMINAL

CROSS-REFERENCE TO RELATED APPLICATION(S)

This application is a continuation of U.S. patent application Ser. No. 15/605,173, filed on May 25, 2017, which claims priority to Chinese Patent Application No. 201610368932.0, filed on May 27, 2016, the contents of both of which are hereby incorporated by reference in their entireties.

TECHNICAL FIELD

The present disclosure relates to the field of electronic technology, and particularly to a method and a device for fingerprint unlocking, and a user terminal.

BACKGROUND

With the rapid development of electronic technology and the rapid popularization of user terminals, functions of the user terminals are becoming more and more perfect, and more and more user terminals are related to fingerprint recognition technology. The fingerprint recognition technology has become one of the standard configurations for flagship models of mainstream user terminal manufacturers, and can be applied to wake up the user terminal, unlock the user terminal, mobile payment, and so on.

SUMMARY

A method and a user terminal are provided for fingerprint unlocking.

A method for fingerprint unlocking is provided. The method may include receiving a partial fingerprint image during a process of pressing a fingerprint recognition sensor of a user terminal, the partial fingerprint image corresponding to part of fingerprints of a finger; matching the partial fingerprint image during the process of receiving the partial fingerprint image; and unlocking the user terminal when the partial fingerprint image is matched.

A user terminal is provided. The user terminal may include a memory configured to store computer-readable program codes; and a processor that may be configured to invoke the computer-readable program codes to execute: receiving a partial fingerprint image during a process of pressing a fingerprint recognition sensor of the user terminal, the partial fingerprint image corresponding to part of fingerprints of a finger; matching the partial fingerprint image during the process of receiving the partial fingerprint image; and unlocking the user terminal when the partial fingerprint image is matched.

A user terminal is also provided. The user terminal may include a memory configured to store computer-readable program codes; and a processor that may be configured to invoke the computer-readable program codes to execute: selecting a partial fingerprint image from N fingerprint region images, each of the N fingerprint region images corresponding to part of fingerprints of a finger; matching the partial fingerprint image; and unlocking the user terminal when the partial fingerprint image is matched.

It is to be understood that both the foregoing general description and the following detailed description are exemplary only, and are not restrictive of the present disclosure.

BRIEF DESCRIPTION OF THE DRAWINGS

In order to illustrate technical solutions of implementations of the present disclosure more clearly, the drawings used in the description of the implementations will be briefly described, it will be apparent that the drawings described in the following are implementations of the present disclosure, and it will be apparent to those skilled in the art that other drawings can be obtained from the drawings without any creative work.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

The technical solutions in the implementations of the present disclosure will be described below clearly and completely in conjunction with the accompanying drawings in the implementations of the present disclosure. The described implementations are some implementations of the present disclosure, not all of the implementations. On the basis of the implementations of the present disclosure, all other implementations obtained by persons skilled in the art without creative efforts shall fall within the protection scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one implementation," "an implementation," "exemplary implementation," or the like in the singular or plural means that one or more particular features, structures, or characteristics described in connection with an example are included in at least one implementation of the present disclosure. Thus, the appearances of the phrases "in one implementation" or "in an implementation," "in an exemplary implementation," or the like in the singular or plural in various places throughout this specification are not necessarily all referring to the same implementation. Furthermore, the particular features, structures, or characteristics in one or more implementations may be combined in any suitable manner.

The fingerprint recognition unlocking may include a screen-on unlocking that a screen of the user terminal is unlocked when the screen is on, and a screen-off unlocking that the screen is unlocked when the screen is off. The screen-off unlocking may further include the screen-off press unlocking, that is, unlocking the screen of the user terminal is triggered by pressing. The process of the screen-off press unlocking may include acquiring a press instruction, initiating a request of pressing the user terminal, receiving a response instruction corresponding to the request of pressing the user terminal, acquiring fingerprint data, matching the fingerprint data, opening a locked screen, opening a locked interface, turning on the screen, and other operations, which results in multiple steps and complex operation.

The time required by the screen-off press unlocking may be a sum of the time of acquiring the press instruction, the time of initiating the request of pressing the user terminal, the time of waiting for the response instruction corresponding to the request of pressing the user terminal, the time of acquiring the fingerprint data, the time of matching the fingerprint data, the time of opening the locked interface, and the time of turning on the screen. Due to the order of processing is single, more waiting time is needed, and the time for unlocking is accordingly long.

Figure 7:
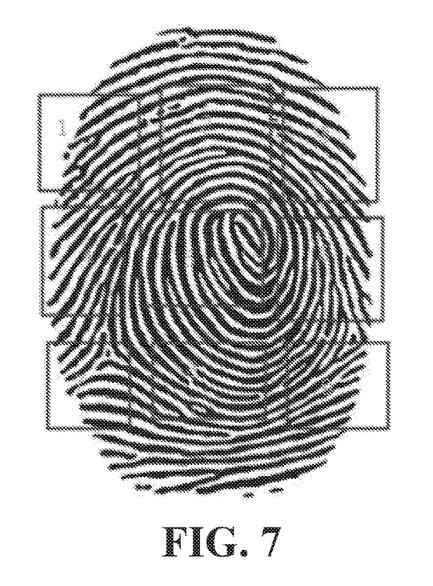
FIG. 7 is a schematic diagram illustrating an example of a fingerprint template.

In the present disclosure, the term "fingerprint template" means that, when a fingerprint function of a terminal such as a mobile phone is enabled for the first time, the user may be asked to undergo a fingerprint registration process. During the fingerprint registration, the user puts his or her finger on a fingerprint sensor (also known as fingerprint identification module) for fingerprint image reception, and the fingerprint image received will be stored as a fingerprint template, usually, one finger corresponds to one fingerprint template. Generally, the fingerprint sensor may receive 10-20 times for each finger in order to receive the whole fingerprint face and generate a comprehensive fingerprint template. Characteristic information can be obtained from the fingerprint image received, and for example, the fingerprint template can be saved in the form of an image. FIG. 7 illustrates an exemplary fingerprint template, and the numbers marked in the fingerprint of FIG. 7 refers to feature points.

In the following, when we refer to "receive" or "receiving" fingerprint image or fingerprint data, it means that a user terminal or a fingerprint recognition sensor of the user terminal or other related components of the user terminal can acquire, collect, obtain or in other manners to get the fingerprint image or fingerprint data. The present disclosure is not limited thereto.

The present disclosure relates to a method for fingerprint unlocking. The method includes the follows. A partial fingerprint image is received during a process of pressing a fingerprint recognition sensor of a user terminal. The partial fingerprint image corresponds to part of fingerprints of a finger. Matching the partial fingerprint image is performed during the process of receiving the partial fingerprint image, and a user terminal is unlocked when the partial fingerprint image is matched with a preset fingerprint template.

The present disclosure further relates to a user terminal to execute the above method. The user terminal described in implementations of the present disclosure may be a smartphone (for example, Android phone, iOS phone, Windows Phone, and so on), a tablet computer, a handheld computer, a mobile internet device (MID), a wearable device, or other. The above terminal is just an example, and the present disclosure is not limited thereto.

Figure 1:
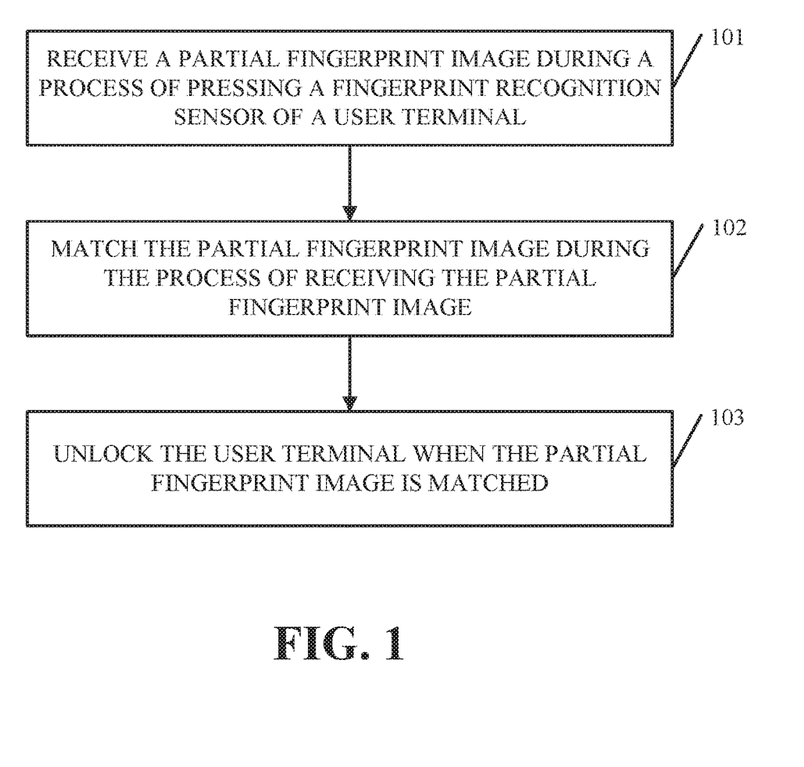
FIG. 1 is a flowchart of a method for fingerprint unlocking in accordance with an implementation of the present disclosure.

FIG. 1 is a flowchart of a method for fingerprint unlocking in accordance with an implementation of the present disclosure. The method for fingerprint unlocking may include the follows.

At block 101, a partial fingerprint image is received during a process of pressing a fingerprint recognition sensor of a user terminal, and the partial fingerprint image corresponds to part of fingerprints of a finger.

In at least one implementation manner, during the process of pressing the fingerprint recognition sensor, fingerprints can be collected by the fingerprint recognition sensor, and part of fingerprints are used to form the partial fingerprint image.

In at least one alternative implementation, the user terminal can receive signals from multiple touch points of the fingerprint recognition sensor to acquire multiple pixel points. When the number of the acquired pixel points is greater than a threshold, the acquired pixel points can be used to form the partial fingerprint image.

In at least one alternative implementation, the user terminal can receive fingerprint images from different directions, and extract feature points of each of the fingerprint images. The fingerprint image having the largest number of feature points is determined as the partial fingerprint image.

In at least one alternative implementation, during the process of pressing the fingerprint recognition sensor, the user terminal can divide the received fingerprint image into multiple regions, and the region with the greatest clarity is determined as the partial fingerprint image.

At block 102, during the process of receiving the partial fingerprint image, the partial fingerprint image is matched.

In at least one implementation manner, the partial fingerprint image can be received by a thread or a process, and matching the partial fingerprint image, for example, matching the partial fingerprint image with a preset fingerprint template is performed by another thread or another processor. That is, the process of receiving the partial fingerprint image and the process of matching the partial fingerprint are executed in parallel. The two processes are executed simultaneously, thus the efficiency of unlocking is improved.

In at least one alternative implementation, the user terminal can extract feature points of the partial fingerprint image and extract feature points of the preset fingerprint template. When the number of matched feature points of the partial fingerprint image and the preset fingerprint template is greater than a preset threshold, it is determined that the partial fingerprint image matches with the preset fingerprint template. Or, the user terminal can perform profile extraction on the partial fingerprint image and the preset fingerprint template. When the number of matched profiles of the partial fingerprint image and the preset fingerprint template is greater than a preset threshold, it is determined that the partial fingerprint image matches with the preset fingerprint template. Or, the user terminal can determine matching degrees between the feature points of the partial fingerprint image and the feature points of the preset fingerprint template, select the matched feature points whose matching degrees are larger than a preset threshold, and determine a possible matching region of the preset fingerprint template whose area is the same as that of the partial fingerprint image according to the matched feature points. The partial fingerprint image is matched with the possible matching region. When the partial fingerprint image matches with the possible matching region, the user terminal is unlocked.

In at least one alternative implementation, the process that the user terminal matches the partial fingerprint image with the preset fingerprint template can be executed in the following manner. The user terminal can extract multiple feature points of the partial fingerprint image. The feature points of the partial fingerprint image can be extracted according to scale invariant feature transform (SIFT) extraction or Harris angle point extraction. Each feature point has its size and direction. The user terminal can select target feature points from the multiple feature points. The user terminal can determine feature points with gray values falling within a preset range to be the target feature points. Generally, when a feature point is too bright or too black, the matching efficiency may be affected. Therefore, a selection needs to be performed on the multiple feature points. The preset range can be determined according to experience. The preset range may be a range from 50 to 180, or a range from 35 to 200, or other. The user terminal can also remove a portion of the multiple feature points according to a preset processing, for example, RANSAC algorithm. To improve the stability of feature points, the RANSAM algorithm can be performed for several times. The remaining feature points are used as the target feature points. The user terminal then matches the target feature points with the preset fingerprint template. Thus, the number of the target feature points is less than that of the multiple feature points, and the target feature points are more stable, accordingly, the matching speed can be improved, and the matching efficiency can be improved.

At block 103, when the partial fingerprint image is matched, the user terminal is unlocked.

In at least one implementation manner, when the partial fingerprint image is matched, receiving a subsequent fingerprint image can be stopped, and the user terminal is unlocked. When the matching of the partial fingerprint image, for example, the matching between the partial fingerprint image and the preset fingerprint template is not completed, the matching between the partial fingerprint image and the preset fingerprint template can be stopped.

In FIG. 1, the partial fingerprint image is received during the process of pressing the fingerprint recognition sensor. Matching the partial fingerprint image is performed during the process of receiving the partial fingerprint image. The user terminal is unlocked when the partial fingerprint image is matched. Thus, by means of the present implementation, the efficiency of unlocking a screen of the user terminal is improved.

Figure 2:
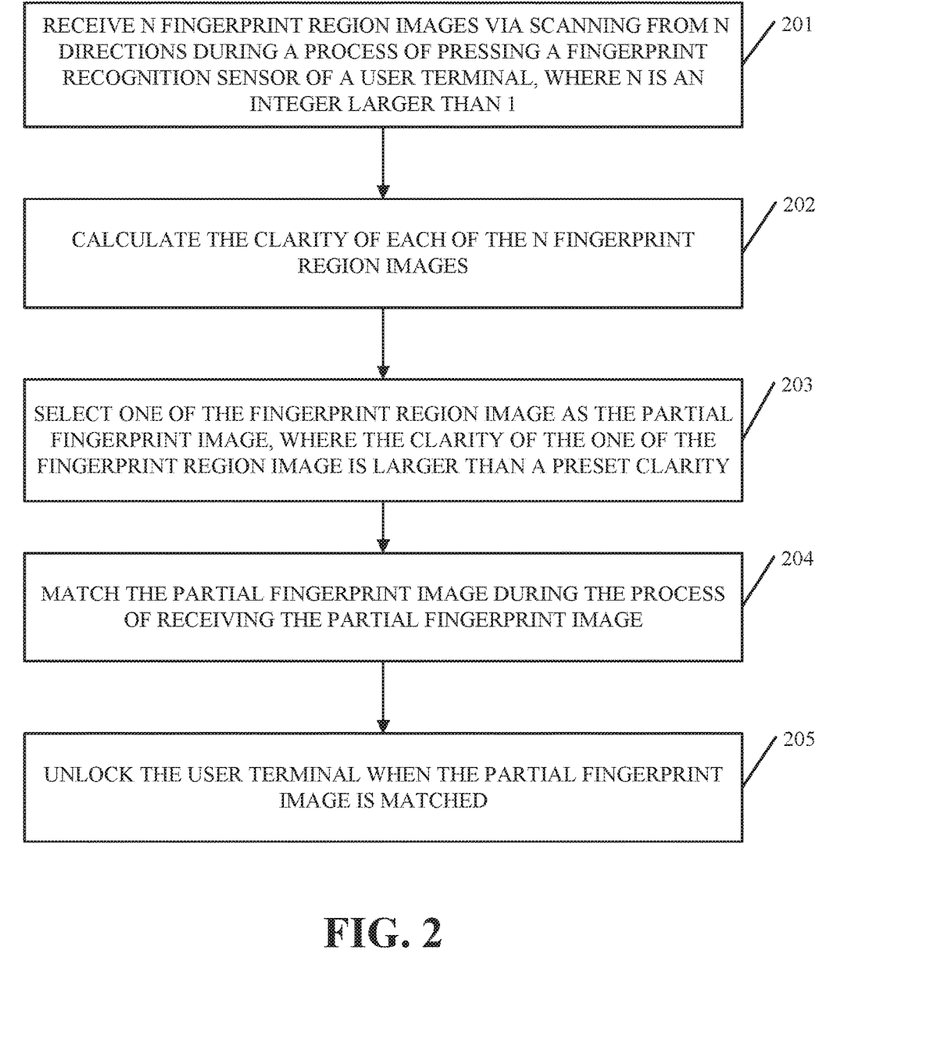
FIG. 2 is a flowchart of another method for fingerprint unlocking in accordance with an implementation of the present disclosure.

FIG. 2 is a flowchart of another method for fingerprint unlocking in accordance with an implementation of the present disclosure. As illustrated in FIG. 2, the method for fingerprint unlocking may include the follows.

At block 201, during a process of pressing a fingerprint recognition sensor of a user terminal, N fingerprint region images are received via scanning from N directions, where N is an integer larger than 1.

In at least one implementation manner, during the process of pressing the fingerprint recognition sensor, at least one direction can be scanned. Thus, fingerprint images from different directions can be received. It is assumed that there are N directions, N fingerprint region images can be received, where N is an integer larger than 1.

Furthermore, the N directions can be scanned simultaneously, or the N directions can be scanned in a time sequence. For example, at the first time point, the first direction is scanned, at the second time point, the second direction is scanned, and so on.

At block 202, the clarity of each of the N fingerprint region images is calculated.

In at least one implementation manner, the user terminal can calculate the clarity of each of the N fingerprint region images.

At block 203, one of the fingerprint region images is selected as the partial fingerprint image, where the clarity of the one of the fingerprint region image is larger than a preset clarity (can be referred to as "a first preset threshold").

In at least one implementation manner, after the clarity of each of the N fingerprint region images is acquired, the clarity of each of the N fingerprint region images can be compared with the preset clarity. When the clarity of one of the N fingerprint region images is greater than the preset clarity, the one of the N fingerprint region images can be determined as the partial fingerprint image. The preset clarity can be a fixed threshold, and can also be a specified threshold. The fixed threshold may be 0.8, 1, 1.2, or other. The specified threshold can be determined according to the clarity of each of the N fingerprint region images. For example, the specified threshold can be the second largest clarity of the N clarities, or an average value of the N clarities, or an average value of the first largest clarity and the smallest clarity.

At block 204, during the process of receiving the partial fingerprint image, the partial fingerprint image is matched. The operation at block 204 can correspond to the operation at block 102.

At block 205, when the partial fingerprint image is matched, the user terminal is unlocked. The operation at block 205 can correspond to the operation at block 103.

In FIG. 2, the N directions are scanned to receive the N fingerprint region images, and N is an integer larger than 1. The clarities of the N fingerprint region images are calculated. The fingerprint region image whose clarity is larger than the preset clarity is determined as the partial fingerprint image. The fingerprint region image with a larger clarity is determined as the partial fingerprint image, thus the time of matching the partial fingerprint image can be reduced. Furthermore, during the process of receiving the partial fingerprint image, receiving the partial fingerprint image, and matching the partial fingerprint image are executed in parallel. When the partial fingerprint image is matched, the user terminal is unlocked. Thus, by means of the present implementation, the efficiency of unlocking a screen of the user terminal is improved.

Figure 3:
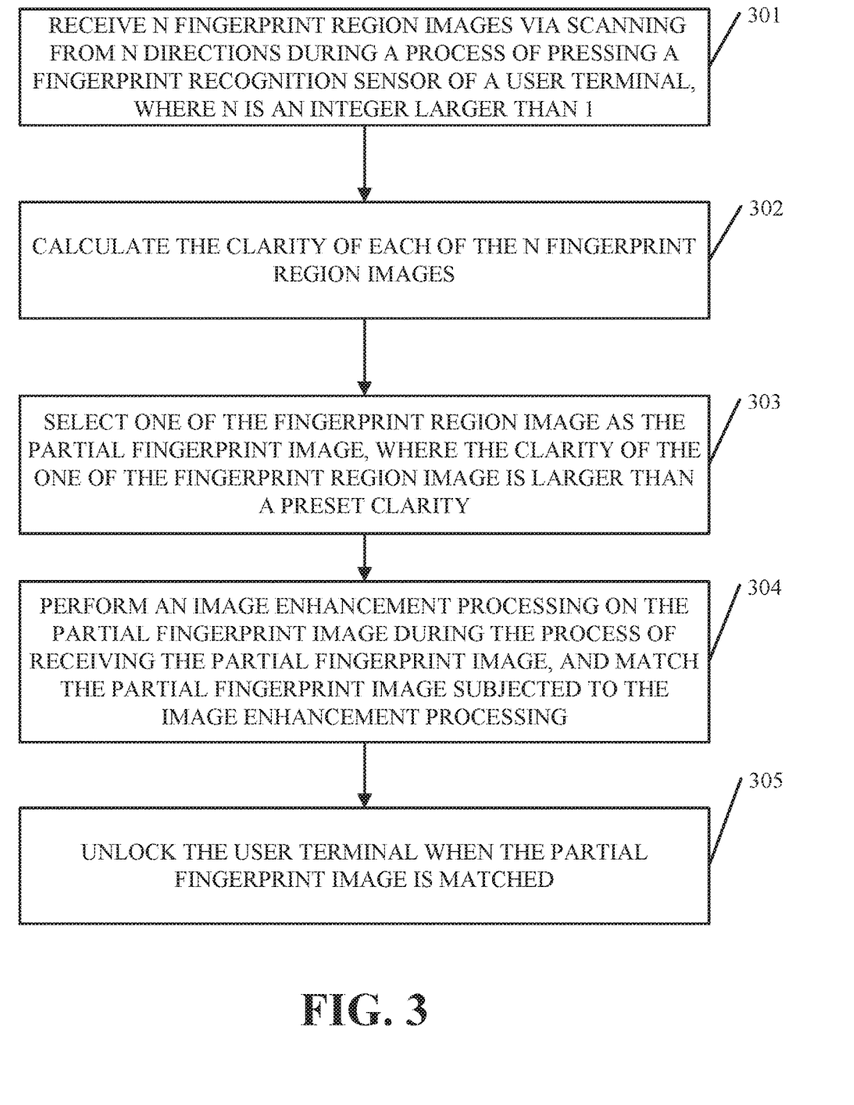
FIG. 3 is a flowchart of yet another method for fingerprint unlocking in accordance with an implementation of the present disclosure.

FIG. 3 is a flowchart of another method for fingerprint unlocking in accordance with an implementation of the present disclosure. The method for fingerprint unlocking may include the follows.

At block 301, during a process of pressing a fingerprint recognition sensor of a user terminal, N directions are scanned to acquire N fingerprint region images, where N is an integer larger than 1.

In at least one implementation manner, during the process of pressing the fingerprint recognition sensor, whether a press force applied to the fingerprint recognition sensor is larger than a preset press force (can also be referred to as a second preset threshold) is judged. The preset press force can be set according to user requirements, or the user terminal can set the preset press force according to history setting records, or the preset press force is a default threshold of the user terminal. The implementation of the present disclosure is not limited thereto. By means of the implementation of the present disclosure, whether to unlock the user terminal can be determined by judging whether the press force applied to the fingerprint recognition sensor is larger than the preset press force. That is, the operation can be recognized as a triggering signal, thus to a certain degree operation of the user terminal is facilitated.

At block 302, the clarity of each of the N fingerprint region images is calculated. The operation at block 302 can correspond to the operation at block 202.

At block 303, one of the fingerprint region images is selected as the partial fingerprint image, where the clarity of the one of the fingerprint region images is larger than a preset clarity. The operation at block 303 can correspond to the operation at block 203.

At block 304, during the process of receiving the partial fingerprint image, an image enhancement processing is performed on the partial fingerprint image, and the partial fingerprint image subjected to the image enhancement processing is matched.

In at least one implementation manner, the partial fingerprint image can be received via a thread or a process, and the image enhancement processing can be performed on the partial fingerprint image via another thread or another process. The partial fingerprint image subjected to the image enhancement processing is matched, for example, matched with a preset fingerprint template. The user terminal can perform the image enhancement processing on the partial fingerprint image, and then the partial fingerprint image subjected to the image enhancement processing is matched with the preset fingerprint template.

In at least one alternative implementation, the user terminal can divide the partial fingerprint image into multiple regions, and calculate a contrast ratio of each of the multiple regions. The image enhancement processing is performed on the region whose contrast ratio is less than a certain threshold. Thus, there is no need to perform the image enhancement processing on each of the multiple regions, and the image enhancement processing is performed on only the region with bad image quality, thus the region with the high clarity is unchanged, and the region with the low clarity becomes clear after performing the image enhancement processing.

Furthermore, after performing the image enhancement processing on the partial fingerprint image, the partial fingerprint image becomes much clearer. Thus, during the process of matching the partial fingerprint image, more feature points can be acquired. Thus, the efficiency of matching the partial fingerprint image with the preset fingerprint image can be improved.

In at least one alternative implementation, during the process that the user terminal receives the partial fingerprint image, performing the image enhancement processing on the partial fingerprint image and matching the partial fingerprint image subjected to the image enhancement processing can be executed in parallel in the following manner. For example, during the process that the user terminal receives the partial fingerprint image, determining whether the clarity of the partial fingerprint image is greater than a certain threshold is executed. When the clarity of the partial fingerprint image is larger than the certain threshold, the partial fingerprint image is matched with the preset fingerprint template. When the clarity of the partial fingerprint image is not larger than the certain threshold, the image enhancement processing is performed on the partial fingerprint image, and the partial fingerprint image subjected to the image enhancement processing is matched with the preset fingerprint template. That is, when the quality of the partial fingerprint image is better, there is no need to perform the image enhancement processing on the partial fingerprint image, and when the quality of the partial fingerprint image is poor, it needs to perform the image enhancement processing on the partial fingerprint image.

In at least one alternative implementation, matching the partial fingerprint image with the preset fingerprint template can be that multiple feature points are extracted from the partial fingerprint image, target feature points are selected from the multiple feature points, and the target feature points are matched with the preset fingerprint template.

Furthermore, selecting the target feature points from the multiple feature points may include that the feature points with gray values falling within a preset range are determined as the target feature points, or a portion of the multiple feature points are removed according to a preset processing, and the remaining feature points among the multiple feature points are determined as the target feature points.

In at least one implementation manner, the user terminal can adopt any of extraction manners (for example, SIFT extraction manner) to extract feature points of the partial fingerprint image.

In at least one implementation manner, the preset range can be set according to user requirements, and can be a default range of the user terminal, and can be further set according to history setting records, and the implementation of the present disclosure is not limited thereto.

In at least one implementation manner, the preset processing can be set according to user requirements, and can be a default preset algorithm of the user terminal, and can further be set according to history setting records, and the implementation of the present disclosure is not limited thereto.

At block 305, when the partial fingerprint image is matched, the user terminal is unlocked. The operation at block 305 can correspond to the operation at block 205 or block 103.

In FIG. 3, multiple feature points are extracted from the partial fingerprint image, target feature points are selected from the multiple feature points, and the target feature points are matched. The image enhancement processing can also be performed on the partial fingerprint image, and then the partial fingerprint image subjected to the image enhancement processing is matched with the preset fingerprint template. By means of the two above matching manners, the time of matching the partial fingerprint image can be reduced, and the efficiency of unlocking a screen of the user terminal is improved.

Figure 4:
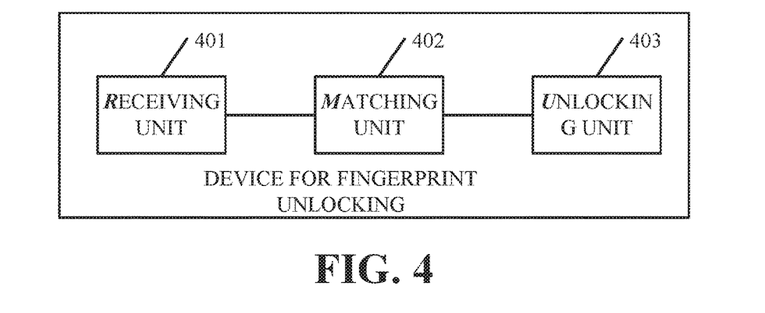
FIG. 4 is a structure diagram of a device for fingerprint unlocking in accordance with an implementation of the present disclosure.

FIG. 4 is a structure diagram of a device for fingerprint unlocking in accordance with an implementation of the present disclosure. The device illustrated in FIG. 4 can be applied in smartphones (for example, Android phones, iOS phones, Windows phones, and so on), tablet computers, handheld computers, laptop computers, MIDs, wearable devices, and so on. As illustrated in FIG. 4, the device for fingerprint unlocking may include a receiving unit 401, a matching unit 402, and an unlocking unit 403.

The receiving unit 401 may be configured to receive a partial fingerprint image during a process of pressing a fingerprint recognition sensor of a user terminal, and the partial fingerprint image corresponds to part of fingerprints of a finger.

In at least one implementation manner, during the process of pressing the fingerprint recognition sensor, fingerprints can be collected by the fingerprint recognition sensor, and a part of fingerprints are used to form the partial fingerprint image.

In at least one alternative implementation, the receiving unit 401 can receive signals from multiple touch points of the fingerprint recognition sensor to acquire multiple pixel points. When the number of the acquired pixel points is greater than a threshold, the acquired pixel points can be used to form the partial fingerprint image.

In at least one alternative implementation, the receiving unit 401 can receive fingerprint images from different directions, and extract feature points of each of the fingerprint images. The fingerprint image having the largest number of feature points is determined as the partial fingerprint image.

In at least one alternative implementation, during the process of pressing the fingerprint recognition sensor, the receiving unit 401 can divide the received fingerprint image into multiple regions, and the region with the greatest clarity is determined as the partial fingerprint image.

The matching unit 402 may be configured to match the partial fingerprint image during the process of receiving the partial fingerprint image.

In at least one implementation manner, the partial fingerprint image can be received by a thread or a process, and matching the partial fingerprint image, for example, matching the partial fingerprint image with a preset fingerprint template can be performed by another thread or another processor. That is, the process that the receiving unit 401 receives the partial fingerprint image and the process that the matching unit 402 matches the partial fingerprint are executed in parallel. The two processes are executed simultaneously, thus the efficiency of unlocking is improved.

In at least one alternative implementation, the matching unit 402 can extract feature points of the partial fingerprint image and extract feature points of the preset fingerprint template. When the number of matched feature points of the partial fingerprint image and the preset fingerprint template is greater than a preset threshold, it is determined that the partial fingerprint image matches with the preset fingerprint template. Or, the matching unit 402 can perform profile extraction on the partial fingerprint image and the preset fingerprint template. When the number of matched profiles of the partial fingerprint image and the preset fingerprint template is greater than a preset threshold, it is determined that the partial fingerprint image matches with the preset fingerprint template. Or, the matching unit 402 can determine matching degrees between the feature points of the partial fingerprint image and the feature points of the preset fingerprint template, select the matched feature points whose matching degrees are larger than a preset threshold, and determine a possible matching region of the preset fingerprint template whose area is the same as that of the partial fingerprint image according to the matched feature points. The partial fingerprint image is matched with the possible matching region. When the partial fingerprint image matches with the possible matching region, the user terminal is unlocked.

In at least one alternative implementation, the process that the matching unit 402 matches the partial fingerprint image with the preset fingerprint template can be executed in the following manner. The matching unit 402 can extract multiple feature points of the partial fingerprint image. The feature points of the partial fingerprint image can be extracted according to scale invariant feature transform (SIFT) extraction or Harris angle point extraction. Each feature point has its size and direction. The matching unit 402 can select target feature points from the multiple feature points. The matching unit 402 can determine feature points with gray values falling within a preset range to be the target feature points. Generally, when a feature point is too bright or too black, the matching efficiency may be affected. Therefore, a selection needs to be performed on the multiple feature points. The preset range can be determined according to experience. The preset range may be a range from 50 to 180, or a range from 35 to 200, or other. The matching unit 402 can also remove a portion of the multiple feature points according to a preset processing, for example, RANSAC algorithm. To improve the stability of feature points, the RANSAM algorithm can be performed for several times. The remaining feature points are used as the target feature points. The user terminal then matches the target feature points with the preset fingerprint template. Thus, the number of the target feature points is less than that of the multiple feature points, and the target feature points are more stable, accordingly, the matching speed can be improved, and the matching efficiency can be improved.

The unlocking unit 403 may be configured to unlock the user terminal when the partial fingerprint image is matched.

In at least one implementation manner, when the partial fingerprint image is matched, receiving a subsequent fingerprint image can be stopped, and the user terminal is unlocked. When the matching of the partial fingerprint image, for example, the matching between the partial fingerprint image and the preset fingerprint template is not completed, the matching between the partial fingerprint image and the preset fingerprint template can be stopped.

In FIG. 4, the receiving unit 401 receives the partial fingerprint image during the process of pressing the fingerprint recognition sensor. The matching unit 402 matches the partial fingerprint image during the process of receiving the partial fingerprint image. The unlocking unit 403 unlocks the user terminal when the partial fingerprint image is matched. Thus, by means of the present implementation, the efficiency of unlocking a screen of the user terminal is improved.

Figure 5:
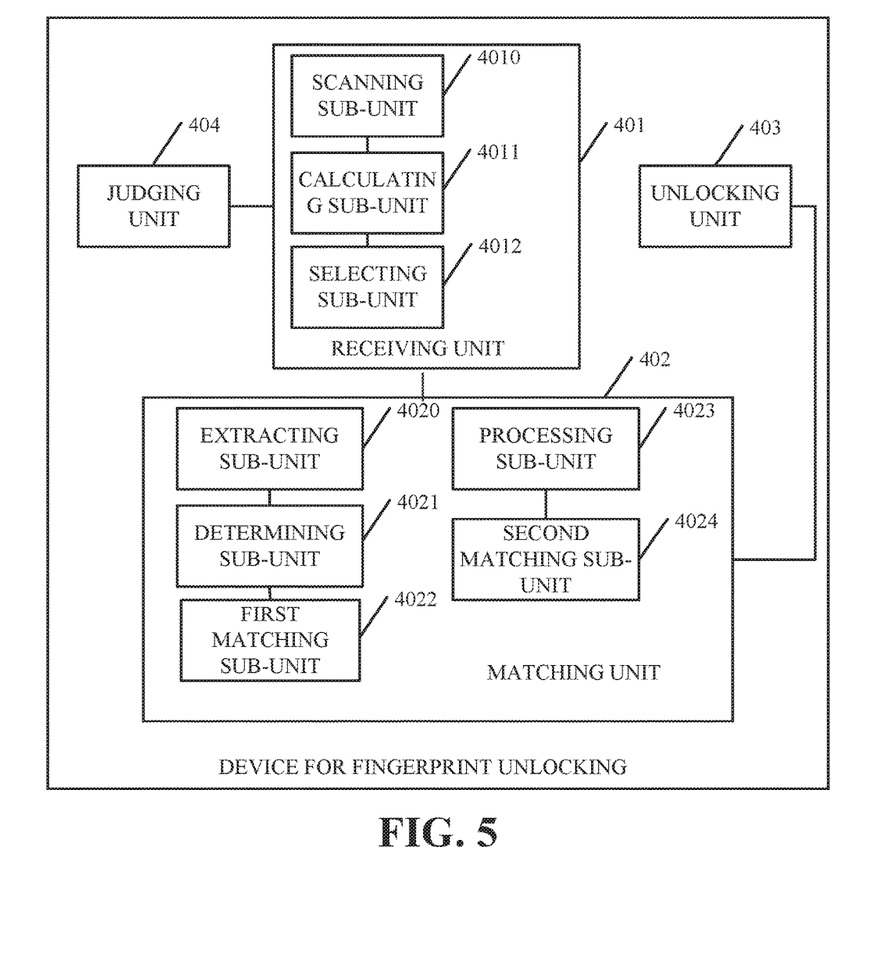
FIG. 5 is a structure diagram of another device for fingerprint unlocking in accordance with an implementation of the present disclosure.

FIG. 5 is another device for fingerprint unlocking in accordance with an implementation of the present disclosure. Besides the receiving unit 401, the matching unit 402, and the unlocking unit 403, the device illustrated by FIG. 5 further may include a judging unit 404 configured to judge whether a press force applied to a fingerprint recognition sensor of a user terminal is larger than a preset press force before the receiving unit 401 receives a partial fingerprint image. The partial fingerprint image corresponds to part of fingerprints of a finger.

The receiving unit 401 may be configured to receive the partial fingerprint image when the judging unit 404 judges that the press force applied to the fingerprint recognition sensor is larger than the preset press force.

In at least one alternative implementation, the receiving unit 401 may include a scanning sub-unit 4010 (can also be referred to as a scanning unit), a calculating sub-unit 4011 (can also be referred to as a calculating unit), and a selecting sub-unit 4012 (can also be referred to as a selecting unit).

The scanning sub-unit 4010 may be configured to acquire N fingerprint region images by scanning from N directions, where N is an integer larger than 1.

The calculating sub-unit 4011 may be configured to calculate the clarity of each of the N fingerprint region images.

The selecting sub-unit 4012 may be configured to select one of the fingerprint region images as the partial fingerprint image, where the clarity of the one of the fingerprint region images is larger than a preset clarity.

In at least one alternative implementation, the matching unit 402 may include an extracting sub-unit 4020 (can also be referred to as an extracting unit), a determining sub-unit 4021 (can also be referred to as a determining unit), and a first matching sub-unit 4022 (can also be referred to as a first matching unit).

The extracting sub-unit 4020 may be configured to perform feature point extraction processing on the partial fingerprint image to acquire multiple feature points.

The determining sub-unit 4021 may be configured to select target feature points from the multiple feature points.

The first matching sub-unit 4022 may be configured to match the target feature points.

In at least one implementation manner, the operation that the determining sub-unit 4021 selects the target feature points from the multiple feature points may include that the determining sub-unit 4021 selects feature points with gray values falling within a preset range as the target feature points, or the determining sub-unit 4021 removes a portion of feature points from the multiple feature points according to a preset processing, and determines the remaining feature points among the multiple feature points as the target feature points.

In at least one alternative implementation, the matching unit 402 may further include a processing sub-unit 4023 (can also be referred to as a processing unit) and a second matching sub-unit 4024 (can also be referred to as a second matching unit).

The processing sub-unit 4023 may be configured to perform an image enhancement processing on the partial fingerprint image.

The second matching sub-unit 4024 may be configured to match the partial fingerprint image subjected to the image enhancement processing.

By means of the implementations illustrated by FIG. 5, the efficiency of unlocking a screen of the user terminal is improved.

In the above implementations, the device for fingerprint unlocking is presented in the form of units. "Units" used herein may refer to any one of an application-specific integrated circuit (ASIC), processors for performing one or more software or hardware programs, a memory, an integrated logic circuit, or other components with the above functions.

Figure 6:
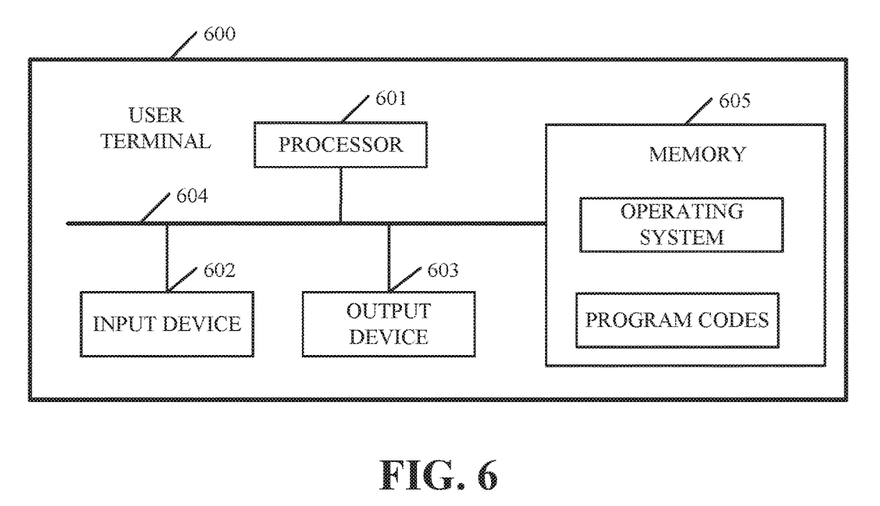
FIG. 6 is a structure diagram of a user terminal in accordance with an implementation of the present disclosure.

FIG. 6 is a structure diagram of a user terminal in accordance with an implementation of the present disclosure, and the user terminal may be configured to execute the method for fingerprint unlocking. As illustrated in FIG. 6, the user terminal 600 may include at least one processor 601, at least one input device 602, at least one output device 603, a memory 604, and other components. These components are coupled and communicate with each other via one or more buses 605. A person skilled in the art shall understand that the structure of the user terminal illustrated in FIG. 6 is not limit the implementation of the present disclosure. The structure can be a bus structure, can also be a star structure, and can include more or fewer components, or some components can be combined, or components can be arranged in a different way. The processor 601 is a control center of the user terminal, and are coupled to various components of the user terminal via various interfaces and lines. The processor 601 runs or executes program codes and/or modules of the memory 604 and invokes data of the memory 604 to execute various functions and data processing of the user terminal. The processor 601 can be formed by an integrated circuit (IC), for example, can be formed by a single packaged IC, and can be formed by coupling multiple ICs having the same function or different functions. For example, the processor 601 can only include a central processing unit (CPU), and can be a combination of the CPU, a digital signal processor (DSP), a graphics processing unit (GPU), and various control chips. In the implementation of the present disclosure, the CPU can be a single computing core, and can also include multiple computing cores.

The input device 602 may include a touch screen, a keyboard, and so on, and can also include a wired interface, a wireless interface, and so on.

The output device 603 can include a display screen, a loudspeaker, and so on, and can also include a wired interface, a wireless interface, and so on.

The memory 604 can store soft programs and modules. The processor 601 invokes the soft programs and modules stored in the memory 604 to execute various functions and data processing of the user terminal. The memory 604 may include a program storing region and a data storing region. The program storing region can store an operating system, computer-readable program codes for at least one function, and so on. The data storing region can store data created according to use of the user terminal. In the implementation of the present disclosure, the operating system can be an Android system, an iOS system, a Windows system, or other.

The processor 601 invokes the computer-readable program codes stored in the memory 604 to execute the follows.

A partial fingerprint image is received during a process of pressing a fingerprint recognition sensor of the user terminal. The partial fingerprint image corresponding to part of fingerprints of a finger. Matching the partial fingerprint image is performed during the process of receiving the partial fingerprint image, and the user terminal is unlocked when the partial fingerprint image is matched.

In at least one implementation, the processor that may be configured to invoke the computer-readable program codes to perform receiving the partial fingerprint image is further configured to perform receiving N fingerprint region images by scanning from N directions, N being an integer larger than 1; calculating the clarity of each of the N fingerprint region images; and selecting one of the N fingerprint region images as the partial fingerprint image, wherein the clarity of each of the one of the N fingerprint region images is larger than a preset clarity.

In at least one implementation, the processor that may be configured to invoke the computer-readable program codes to execute matching the partial fingerprint image is further configured to execute performing a feature point extraction processing on the partial fingerprint image to acquire multiple feature points, selecting target feature points from the multiple feature points, and matching the target feature points with a preset fingerprint template.

In at least one implementation, the processor that may be configured to invoke the computer-readable program codes to execute selecting the target feature points from the multiple feature points is further configured to execute at least one of the follows: determining feature points with grey values falling within a preset range to be the target feature points; and removing a portion of the multiple feature points according to a preset processing, and determining the remaining feature points among the multiple feature points as the target feature points.

In at least one implementation, the processor that may be configured to invoke the computer-readable program codes to execute matching the partial fingerprint image is further configured to execute performing an image enhancement processing on the partial fingerprint image, and matching the partial fingerprint image subjected to the image enhancement processing with a preset fingerprint template.

In at least one implementation, the processor is further configured to execute the follows before receiving the partial fingerprint image: determining whether a press force applied to the fingerprint recognition sensor is larger than a preset press force; and proceeding to the process of receiving the partial fingerprint image when the press force applied to the fingerprint recognition sensor is larger than the preset press force.

The user terminal illustrated in the implementations can implement a part of or all of the procedures of the method for fingerprint unlocking illustrated by FIG. 1, FIG. 2, or FIG. 3.

The units or sub-units of the implementations of the present disclosure can be realized by a general integrated circuit, for example, a CPU, an application specific integrated circuit (ASIC).

According to actual needs, the order of the operations of the methods in the implementations of the present disclosure can be adjusted, some operations can be merged into one operation, and some operation can be deleted.

According to actual needs, some units of the terminals in the implementations of the present disclosure can be merged into one unit, some unit can be divided into several units, and some unit can be deleted.

Those skilled in the art can understand that all or a part of procedures can be accomplished by using a computer program to instruct related hardware. The program can be stored in a computer-readable storage medium. When the program is executed, the procedures of the implementations of the above-mentioned methods can be included. Wherein, the storage medium can be a magnetic disk, an optical disk, a ROM (Read-Only Memory, ROM), a RAM (Random Access Memory, RAM), or the like.

The present disclosure may include dedicated hardware implementations such as application specific integrated circuits, programmable logic arrays, and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

The implementations described above are merely preferred ones of the present disclosure but are not limitations to the protection scope of the present disclosure, thus equivalent variations made according to the appended claims of the present disclosure still fall within the scope of the present disclosure.

What is claimed is:

1. A method for fingerprint unlocking, comprising:
receiving, by a user terminal, a partial fingerprint image during a process of pressing a fingerprint recognition module of the user terminal;
wherein receiving, by the user terminal, the partial fingerprint image comprises:
dividing, by the user terminal, a fingerprint image received by the user terminal into multiple regions;
calculating, by the user terminal, a clarity of each of the multiple regions;
determining, by the user terminal, among the multiple regions a region with the greatest clarity as the partial fingerprint image;
judging, by the user terminal and before receiving the partial fingerprint image by the user terminal, whether a press force applied to the fingerprint recognition module is larger than a preset threshold, and receiving by the user terminal, the partial fingerprint image when the press force applied to the fingerprint recognition module is larger than the preset threshold;
matching, by the user terminal, the partial fingerprint image with a preset fingerprint template; and
unlocking, by the user terminal, the user terminal when the partial fingerprint image is matched with the preset fingerprint template;
wherein, matching, by the user terminal, the partial fingerprint image with the preset fingerprint template comprises:
performing, by the user terminal, a feature point extraction processing on the partial fingerprint image to acquire multiple feature points;
selecting, by the user terminal, target feature points from the multiple feature points;
matching, by the user terminal, the target feature points with the preset fingerprint template, and
wherein, selecting, by the user terminal, the target feature points from the multiple feature points comprises:
determining, by the user terminal, among the multiple feature points feature points with grey values falling within a preset range to be the target feature points; and
removing, by the user terminal, a portion of the multiple feature points according to a preset processing, and determining, by the user terminal, the remaining feature points among the multiple feature points as the target feature points.

2. A user terminal, comprising a memory and a processor, wherein the memory and the processor are coupled through a bus;
the memory being configured to store computer-readable program codes; and
the processor being configured to invoke the computer-readable program codes stored in the memory to execute:

receiving, by a user terminal, a partial fingerprint image during a process of pressing a fingerprint recognition module of the user terminal;
wherein receiving, by the user terminal, the partial fingerprint image comprises:
dividing, by the user terminal, a fingerprint image received by the user terminal into multiple regions;
calculating, by the user terminal, a clarity of each of the multiple regions;
determining, by the user terminal, among the multiple regions a region with the greatest clarity as the partial fingerprint image;
judging, by the user terminal and before receiving the partial fingerprint image by the user terminal, whether a press force applied to the fingerprint recognition module is larger than a preset threshold, and receiving by the user terminal, the partial fingerprint image when the press force applied to the fingerprint recognition module is larger than the preset threshold;
matching, by the user terminal, the partial fingerprint image with a preset fingerprint template; and
unlocking, by the user terminal, the user terminal when the partial fingerprint image is matched with the preset fingerprint template; and
wherein, matching, by the user terminal, the partial fingerprint image with the preset fingerprint template comprises:
performing, by the user terminal, a feature point extraction processing on the partial fingerprint image to acquire multiple feature points;
selecting, by the user terminal, target feature points from the multiple feature points;
matching, by the user terminal, the target feature points with the preset fingerprint template, and
wherein, selecting, by the user terminal, the target feature points from the multiple feature points comprises:
determining, by the user terminal, among the multiple feature points feature points with grey values falling within a preset range to be the target feature points; and
removing, by the user terminal, a portion of the multiple feature points according to a preset processing, and determining, by the user terminal, the remaining feature points among the multiple feature points as the target feature points.

* * * * *